(12) United States Patent
Kim

(10) Patent No.: US 10,794,353 B2
(45) Date of Patent: Oct. 6, 2020

(54) VEHICLE SYSTEM INCLUDING IDLE STOP AND GO FUNCTION AND METHOD FOR CONTROLLING IDLE STOP AND GO

(71) Applicants: Hyundai Motor Company, Seoul (KR); Kia Motors Corporation, Seoul (KR)

(72) Inventor: Jin Kim, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/162,722

(22) Filed: Oct. 17, 2018

(65) Prior Publication Data

US 2019/0376482 A1 Dec. 12, 2019

(30) Foreign Application Priority Data

Jun. 12, 2018 (KR) ........................ 10-2018-0067162

(51) Int. Cl.
*F02N 11/08* (2006.01)
*B60W 10/06* (2006.01)
*H04W 4/44* (2018.01)

(52) U.S. Cl.
CPC ......... *F02N 11/0837* (2013.01); *B60W 10/06* (2013.01); *F02N 11/0825* (2013.01); *F02N 11/0829* (2013.01); *H04W 4/44* (2018.02)

(58) Field of Classification Search
CPC .......... F02D 17/04; F02D 29/00; F02D 29/02; F02D 41/22; F02D 45/00; F02N 11/08; F02N 11/0825; F02N 11/0829; F02N 11/0837; B60W 10/06; H04W 4/44

USPC ............ 701/65, 101, 112–115; 340/455, 540
See application file for complete search history.

(56) References Cited

U.S. PATENT DOCUMENTS

| 2004/0038774 | A1* | 2/2004 | Kuroda | ................... B60K 6/485 477/3 |
| 2005/0234772 | A1* | 10/2005 | Haruki | ............... G06Q 30/0231 705/14.31 |
| 2006/0058964 | A1* | 3/2006 | Lucas | ....................... B60T 7/22 701/301 |
| 2007/0225882 | A1* | 9/2007 | Yamaguchi | ......... B60W 30/095 701/36 |

(Continued)

*Primary Examiner* — John Kwon
*Assistant Examiner* — Johnny H Hoang
(74) *Attorney, Agent, or Firm* — Morgan, Lewis & Bockius LLP

(57) ABSTRACT

An ISG vehicle system may include an alternator supplying electric power of a vehicle and alternating engine power to electrical energy, a battery storing the electric power of the vehicle, an alternator supplying electric power of a vehicle and alternating engine power to electrical energy, a V2X controller receiving external infrastructure information and determining vehicle location, an ISG controller obtaining the external infrastructure information and the vehicle location through communication with the V2X controller and obtaining the status of the battery and charge amount information through communication with the battery sensor to determine operable time of ISG (Idle Stop and Go) function of the vehicle and whether the ISG function operates, and an engine controller receiving operation signal of the ISG function through communication with the ISG controller to determine whether the engine operates.

15 Claims, 16 Drawing Sheets

(56) References Cited

U.S. PATENT DOCUMENTS

| | | | |
|---|---|---|---|
| 2009/0091439 A1* | 4/2009 | Sekiyama | G01C 21/3697 340/459 |
| 2010/0145562 A1* | 6/2010 | Moran | B60L 7/10 701/22 |
| 2010/0168992 A1* | 7/2010 | Nakata | F02D 29/02 701/112 |
| 2011/0005486 A1* | 1/2011 | Nakamura | F02N 11/0837 123/179.4 |
| 2011/0208410 A1* | 8/2011 | Izumoto | B60W 10/06 701/112 |
| 2012/0133500 A1* | 5/2012 | Yu | F02N 11/0818 340/455 |
| 2014/0167944 A1* | 6/2014 | Yamaguchi | B60K 37/02 340/439 |
| 2014/0343830 A1* | 11/2014 | Elwart | F02N 11/0837 701/112 |
| 2019/0193714 A1* | 6/2019 | Kim | B60W 20/12 |

* cited by examiner

FIG. 8

| Items | | Management items |
|---|---|---|
| 1 | Road and location information | ⓐ Road type, ⓑ Number of the branch roads, ⓒ Current vehicle location information, ⓓ Current road lane number |
| 2 | Road signal information | ⓔ Signal type of diverging road, ⓕ Signal change time matrix of signal type of diverging road |
| 3 | Battery information | ⓖ Battery charge amount, ⓗ Overage degree, ⓘ Battery consumption amount, ⓙ Error information |
| 4 | Vehicle information | ⓚ Current ISG status, ⓛ ISG operable time, ⓜ Current time, ⓝ Vehicle speed, ⓞ Fuel injection amount |

FIG. 11

| Branch type | Signal type | | | |
|---|---|---|---|---|
| Left turn | Left turn | Straight and left turn | Caution | Stop |
| Straight | Stop | Caution | Drive | - |
| Right turn | Stop | Caution | Drive | Right turn |
| U turn | Left turn | Stop | - | - |

FIG. 12

| Branch type | Signal type | | | |
|---|---|---|---|---|
| Left turn | Left turn | Straight and left turn | Caution | Stop |
| Right turn | Stop | Caution | Drive | Right turn |

FIG. 13

| Branch type | Signal change queue | | | | | | | |
|---|---|---|---|---|---|---|---|---|
| Time | 10h30m10s | 10h30m14s | 10h30m18s | 10h30m23s | 10h30m30s | 10h30m40s | 10h31m1s | 10h31m2s | 10h31m12s |
| Left turn | Left turn signal | Stop | Straight | Straight and left turn | Left turn | ... | ... | ... | ... |
| Straight | Stop | Stop | Straight | Straight | Caution | ... | ... | ... | ... |
| Right turn | Stop | Stop | Right turn | Right turn | Stop | ... | ... | ... | ... |
| U turn | Left turn | Stop | Stop | Left turn | Left turn | ... | ... | ... | ... |

<Initial battery status>   <Overage battery status>

VEHICLE SYSTEM INCLUDING IDLE STOP AND GO FUNCTION AND METHOD FOR CONTROLLING IDLE STOP AND GO

CROSS-REFERENCE TO RELATED APPLICATION

The present application claims priority to Korean Patent Application No. 10-2018-0067162 filed on Jun. 12, 2018, the entire contents of which is incorporated herein for all purposes by this reference.

BACKGROUND OF THE INVENTION

Field of the Invention

The present invention relates to an ISG (Idle Stop and Go) vehicle system and method for controlling ISG. More particularly, the present invention relates to a vehicle system including ISG and method for controlling ISG.

Description of Related Art

Efforts have been being made to reduce carbon dioxide generated by combustion of a fuel in a vehicle all over the world and to improve fuel efficiency of the vehicle in accordance with an era of high oil prices.

An idle stop & go (ISG) system has been developed to meet the efforts. It has been proven that the ISG system can reduce an amount of carbon dioxide generated in the vehicle and can cause enhancement of fuel efficiency.

The ISG system is an engine control system that stops an engine of the vehicle to prevent the engine from operating when the vehicle decelerates or stops and drives the engine again to enable the vehicle to move when the vehicle starts.

The ISG system utilizes information such as the vehicle speed, the engine speed, and the engine coolant temperature to stop the engine when the engine is idling. In other words, the ISG system automatically stops the idling engine when the vehicle decelerates or stops due to a traffic signal and restarts the engine to start the vehicle after a predetermined time. The ISG system may also be expressed as an idling stop control unit. The ISG system can achieve fuel economy of about 5 to 15% in a fuel economy mode. The vehicle provided with the ISG system is referred to as an ISG vehicle.

Because the ISG system prevents the engine from operating when the vehicle decelerates or stops, the fuel cannot be used. Thus, the fuel efficiency of the vehicle may be improved and the carbon dioxide cannot be discharged.

The ISG system may include a method of starting the engine using an electric motor and a method of starting the engine using a hydraulic motor. A passenger vehicle can use the method of starting the engine using the electric motor.

In the present electric motor type IGS system, the engine starter has to be restarted to use ISG function, therefore battery charge amount has to be maintained to be more than predetermined amount. The present battery charge amount reference is determined according to specifications of vehicle or power system characteristics (capacity, kind of battery, power distribution structure, generating control, dark current, consumption current control etc.) of OEM (Original Equipment Manufacturer). By the way, reference of SOC (Status of Charge) is raised, ISG operation time is limited or electricity load performance is limited due to big current load excessively consuming the battery SOC, therefore there are many cases that the ISG function is off.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a method for controlling a vehicle including ISG function which may optimize operation time of the ISG function and improve fuel efficiency additionally by determining ISG operation time and controlling the ISG using external infrastructure information transmitted from a V2X (Vehicle to Everything).

An ISG vehicle system according to an exemplary embodiment of the present invention may include an alternator supplying electric power of a vehicle and alternating engine power to electrical energy, a battery storing the electric power of the vehicle, an alternator supplying electric power of a vehicle and alternating engine power to electrical energy, a V2X controller receiving external infrastructure information and determining vehicle location, an ISG controller obtaining the external infrastructure information and the vehicle location through communication with the V2X controller and obtaining the status of the battery and charge amount information through communication with the battery sensor to determine operable time of ISG (Idle Stop and Go) function of the vehicle and whether the ISG function operates, and an engine controller receiving operation signal of the ISG function through communication with the ISG controller to determine whether the engine operates.

The ISG vehicle system according to an exemplary embodiment of the present invention may further include electric loads consuming electricity such as an air conditioning blower, a chassis, an engine injector, a seat heating wire, and a ventilation motor.

The ISG vehicle system according to an exemplary embodiment of the present invention may further include an electric loads controller receiving signal of the electric loads and controlling output of the electric loads to realize controlling function according to a specific function of an air conditioning system of the vehicle, a seat system, an engine and a transmission.

The battery sensor may include a communication unit transmitting and receiving information with outside, a voltage sensing unit monitoring voltage status of the battery, a current sensing unit monitoring current coming and going to the battery, a temperature sensing unit monitoring liquid temperature of the battery, and an SOC determining unit determining status of charge of the battery using the voltage, current, and temperature of the battery.

The V2X controller may transmit information received from outside through wireless network from an external infrastructure information transmitting device to inside the vehicle.

The V2X controller may combine global poisoning system (GPS) information received from a vehicle navigation unit and the external infrastructure information received from the external infrastructure information transmitting device to determine the vehicle location, and transmit the external infrastructure information and the vehicle location to the ISG controller.

The ISG controller may include a communication unit communicates with the battery sensor and the V2X controller, and an ISG driving determination unit realizing whether ISG function of the vehicle operates using the battery status information, the external infrastructure information and the vehicle information obtained through the communication unit.

The external infrastructure information may include road and location information and road signal information.

The road and location information may include road type, diverging road number, current vehicle location, and current driving road lane number.

The road signal information may include signal type of diverging road, and signal change time matrix of the signal type of diverging road.

The battery status information may include battery charge amount, battery overage degree, battery consumption amount, and battery error information.

The vehicle information may include current ISG status, ISG operable time, current time, vehicle speed, and fuel injection amount.

Method for controlling ISG according to an exemplary embodiment of the present invention may include receiving road and location information, road signal information, battery status information, and vehicle information by an ISG controller, renewing road information, map data, time information, and battery status information according to a vehicle location by the ISG controller, renewing road signal change time matrix according to the time information, renewing ISG operable time by the battery status information, determining whether a vehicle speed is 0, determining a vehicle stop time by the road signal change time matrix if the vehicle speed is 0, obtaining fuel injection amount information necessary to restart the engine after the ISG operates, determining whether fuel amount being saved by the ISG operation is more than fuel injection amount necessary to restart the engine, transmitting a signal to an engine controller to turn off the engine if the fuel amount being saved by the ISG operation is more than the fuel injection amount necessary to restart the engine, determining whether the engine is turned off, determining whether the ISG operable time is less than the road signal change time if the engine is turned off, transmitting a signal to the engine controller to turn on the engine if the ISG operable time is less than the road signal change time, and obtaining a fuel injection amount consumed during restarting the engine after the ISG operates and determining a mean value of the fuel injection amount.

The road and location information and road signal information may be collected from an external infrastructure information transmitting device and transmitted to the ISG controller by a V2X controller.

The battery status information may be collected as battery charge amount information by a battery sensor.

The vehicle location and map data information may be collected by a navigation device.

The ISG operable time may be expected as time at a minimum charge amount that vehicle start is possible after obtaining inclination of battery consumption amount by obtaining a difference value between initial battery charge amount and battery overage degree, current time, and battery charge amount value on a basis of the battery status information.

The current time may be obtained on a basis of time information transmitted from the V2X controller and a GPS.

Total fuel injection amount may be determined by accumulating mean values of fuel injection amount necessary to start the engine when the ISG operates.

According to an exemplary embodiment of the present invention, optimized control before the engine is turned off and after the engine is turned off and growth of ISG operable time may improve fuel efficiency effect by providing an ISG vehicle system which expects the ISG operable time using battery charge amount while driving and electric loads consumption amount and starts and ends the ISG operation by being connected to an external infrastructure information.

Furthermore, starter motor durability for ISG may be enhanced by optimizing starting ON/OFF.

Furthermore, usability may be improved by determining ISG operable time because the ISG operable time may be displayed.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 8 is a table illustrating data management items necessary to determine ISG operation of an ISG controller according to an exemplary embodiment of the present invention.

FIG. 11 is a table illustrating signal type of diverging road at a crossroad of left side portion of FIG. 10.

FIG. 12 is a table illustrating signal type of diverging road at a crossroad of right side portion of FIG. 10.

FIG. 13 is a table illustrating signal change time matrix of signal type of diverging road at a crossroad of left side portion of FIG. 10.

Figure 1:
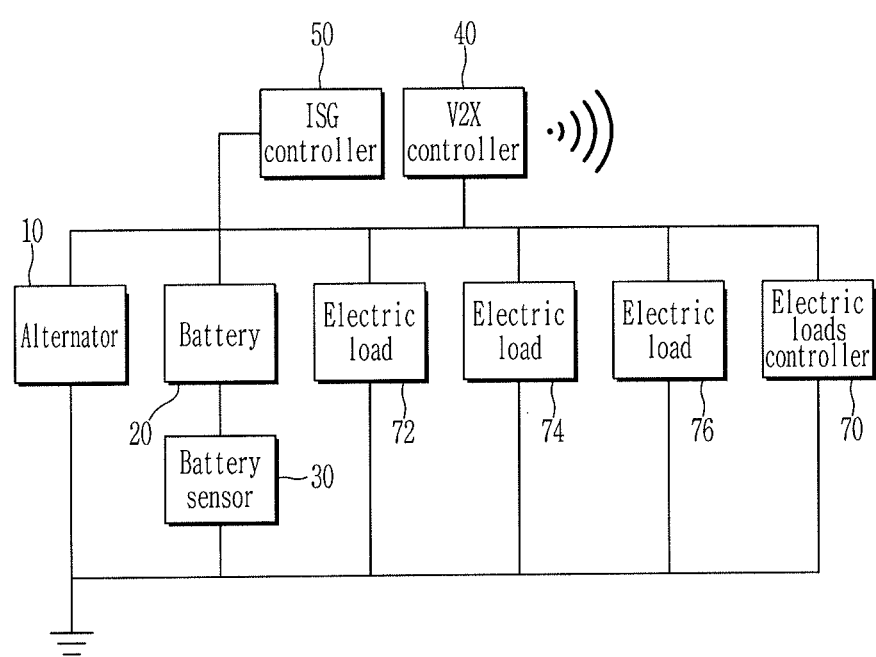
FIG. 1 is a block diagram illustrating a schematic electric power configuration of an ISG vehicle system according to an exemplary embodiment of the present invention.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

In the following detailed description, various exemplary embodiments of the present invention will be described more fully with reference to the accompanying drawings, in which exemplary embodiments of the invention are shown. As those skilled in the art would realize, the described embodiments may be modified in various different ways, all without departing from the spirit or scope of the present invention.

Furthermore, in the following exemplary embodiments of the present invention, the components having the same configuration are designated by the same reference numerals and described in the various exemplary embodiments of the present invention, and only other configurations different from the various exemplary embodiments are described in the other exemplary embodiments.

It may be understood that drawings are schematically illustrated but are not illustrated in accordance with a scale. A relative size and a ratio of a part in the drawing are exaggerated or reduced for clarity and convenience and an arbitrary size may be illustrative but the present invention is not limited thereto. Furthermore, the same reference numeral designates the same structure, element, or component illustrated in two or more drawings to indicate similar characteristics. It will be understood that when a layer is referred to as being "on" or "above" another layer or substrate, it may be directly on the other layer or substrate, or intervening them may also be present.

Exemplary embodiments of the present invention specifically describe an exemplary embodiment of the present invention. As a result, numerous variations of drawings are expected. Therefore, the exemplary embodiments are not limited to a specific type of an illustrated region, and for example, a modification by manufacturing is also included.

Hereinafter, an ISG vehicle system according to an exemplary embodiment of the present invention will be described with reference to FIGS. 1 to 7.

Figure 2:
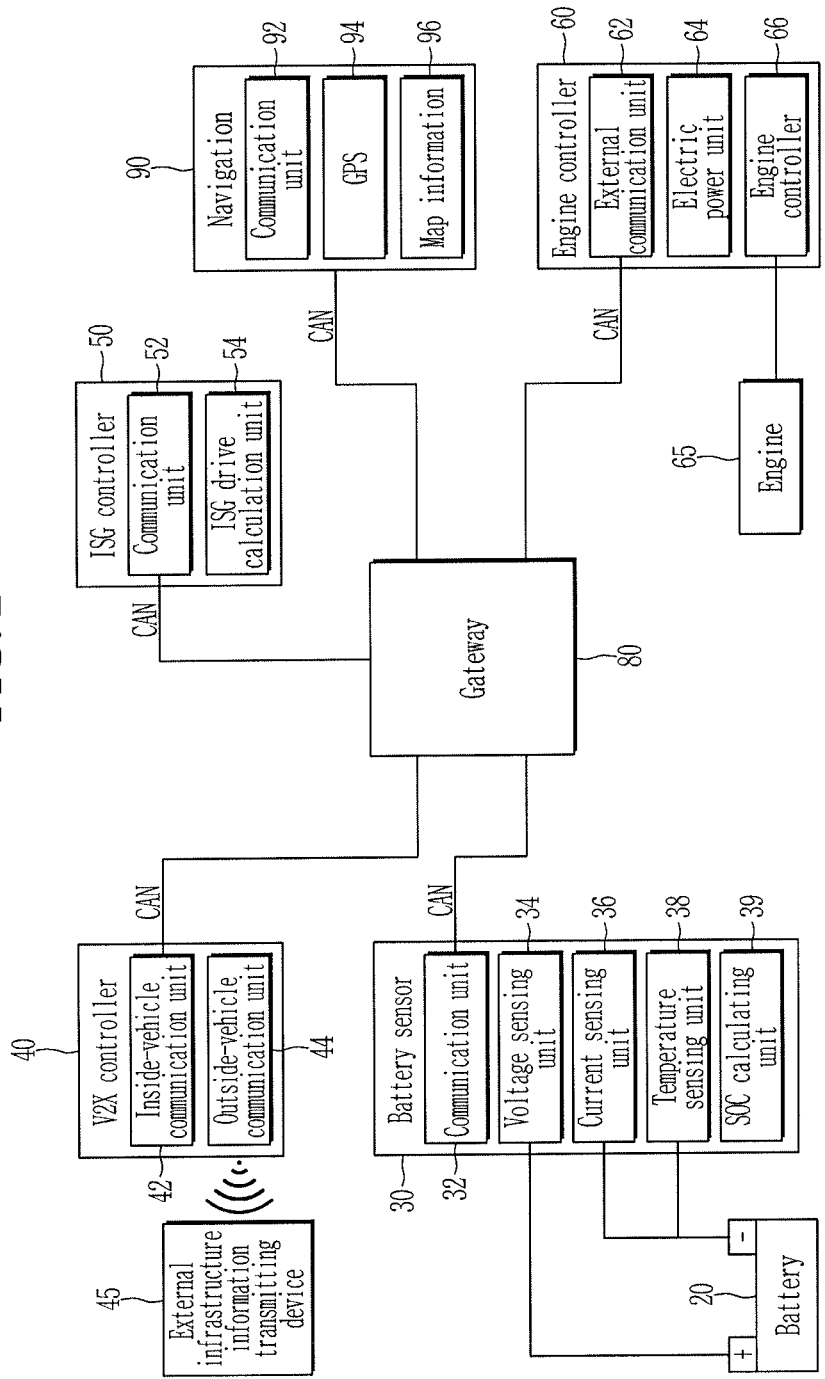
FIG. 2 is a block diagram illustrating a schematic communication configuration of an ISG vehicle system according to an exemplary embodiment of the present invention.
Figure 3:
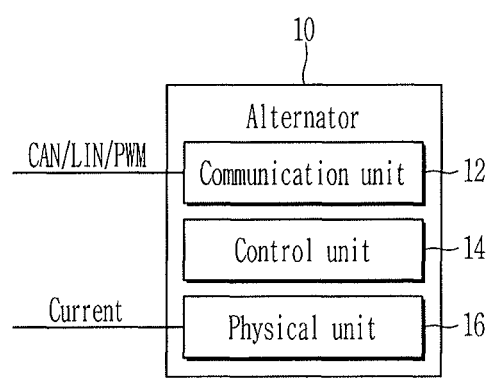
FIG. 3 is a drawing illustrating a schematic configuration of an alternator according to an exemplary embodiment of the present invention.
Figure 4:
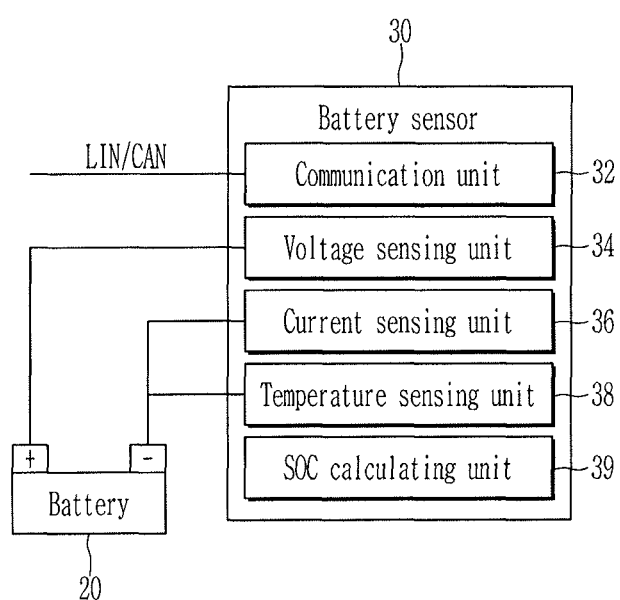
FIG. 4 is a drawing illustrating a schematic configuration of a battery sensor according to an exemplary embodiment of the present invention.
Figure 5:
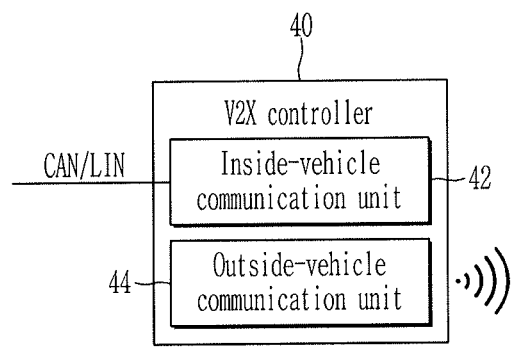
FIG. 5 is a drawing illustrating a schematic configuration of a V2X according to an exemplary embodiment of the present invention.
Figure 6:
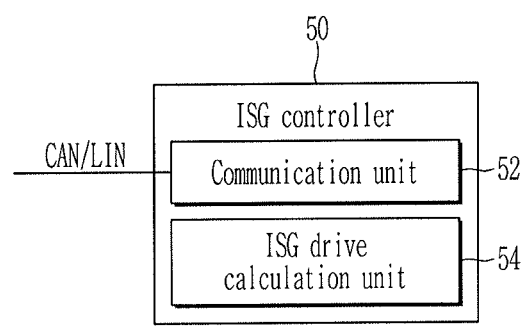
FIG. 6 is a drawing illustrating a schematic configuration of an ISG controller according to an exemplary embodiment of the present invention.
Figure 7:
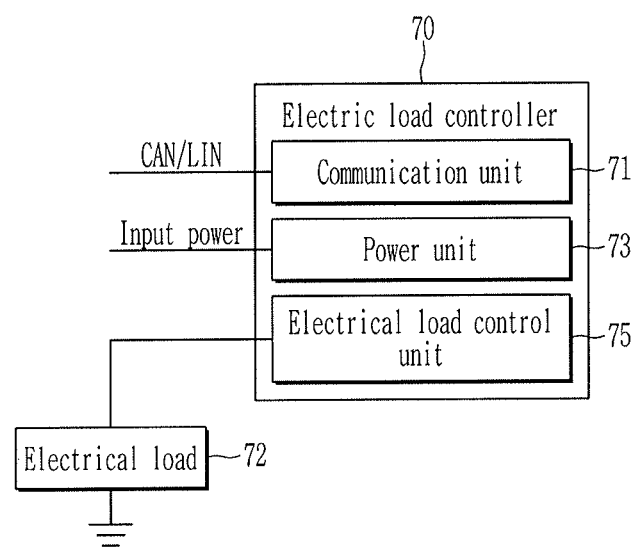
FIG. 7 is a drawing illustrating a schematic configuration of an electric load controller according to an exemplary embodiment of the present invention.

FIG. 1 is a block diagram illustrating a schematic electric power configuration of an ISG vehicle system according to an exemplary embodiment of the present invention, FIG. 2 is a block diagram illustrating a schematic communication configuration of an ISG vehicle system according to an exemplary embodiment of the present invention, FIG. 3 is a drawing illustrating a schematic configuration of an alternator according to an exemplary embodiment of the present invention, FIG. 4 is a drawing illustrating a schematic configuration of a battery sensor according to an exemplary embodiment of the present invention, FIG. 5 is a drawing illustrating a schematic configuration of a V2X according to an exemplary embodiment of the present invention, FIG. 6 is a drawing illustrating a schematic configuration of an ISG controller according to an exemplary embodiment of the present invention, and FIG. 7 is a drawing illustrating a schematic configuration of an electric load controller according to an exemplary embodiment of the present invention.

Referring to FIG. 1, an ISG vehicle system includes an alternator 10, a battery 20, a battery sensor 30, a V2X controller 40, an ISG controller 50, electric loads 72, 74 and 76, and an electric load controller 70.

The alternator 10 supplies electric power of a vehicle and alternates power of engine 65 to electrical energy. The alternator 10 may generate electricity depending on the amount of electricity requested from outside. As shown in FIG. 3, the alternator 10 may include a communication unit 12 for receiving information such as a power generation amount from outside, a control unit 14 for classifying and applying information, and a physical unit 16 for supplying applied information to the outside as electrical energy.

The battery 20 is a device configured for storing electric power for starting the vehicle, and may be a lead acid battery, a lithium ion battery, or the like, and may be provided with at least one or more.

The battery sensor 30 constantly monitors the status of the battery 20, transmits and receives information to or from the outside, and determines the charged amount of the battery 20 according to the status of the battery 20. As shown in FIG. 4, the battery sensor 30 may include a communication unit 32 for transmitting and receiving information to or from the outside, a voltage sensing unit 34 for monitoring a voltage status of the battery 20, a current sensing unit 36 for monitoring transmitting and receiving current to or from the battery 20, a temperature sensing unit 38 for monitoring the liquid temperature of the battery 20 and an SOC determining unit 39 for determining an SOC using the voltage, current, and temperature of the battery 20.

The V2X controller 40 receives the external infrastructure information and determines the vehicle location. The V2X controller 40 transmits information transmitted from the external infrastructure information transmitting device 45 through a wireless network to inside the vehicle. As shown in FIG. 5, the V2X controller 40 includes an inside-vehicle communication unit 42 and an outside-vehicle communication unit 44. The V2X controller 40 receives GPS information transmitted from the vehicle navigation unit 90 and the external infrastructure information transmitted from the external infrastructure information transmitting device 45 to determine the vehicle location and to transmit the external infrastructure information and the vehicle location to the ISG controller 50.

The ISG controller 50 obtains the external infrastructure information and the vehicle location through communication with the V2X controller 40 and obtains the status of the battery 20 and the charge amount information through communication with the battery sensor 30 to determine operable time of ISG (Idle Stop and Go) function of the vehicle. As shown in FIG. 6, the ISG controller 50 includes a communication unit 52 for communicating with the battery sensor 30 and the V2X controller 40 and an ISG drive determination unit 54 for realizing whether or not the ISG function of the vehicle is operated using the status information related to the battery 20, the external infrastructure information and the vehicle information obtained through the communication unit 52.

The electric loads 72, 74, and 76 are devices that consume electricity such as an air conditioning blower motor, a chassis motor, an engine injector, a sheet heating wire, and a ventilation motor, and operate or do not operate in accordance with the control signal of the electric load controller 70. The electrical loads 72, 74, and 76 may be formed of an inductor component, a resistor component, a capacitor component, and a combination thereof. Capacity and operation characteristics may vary depending on the specifications of the system.

The electric load controller 70 is a device that implements a control function according to a specific purpose such as an air conditioning system of a vehicle, a seat system, an engine, and a transmission. As shown in FIG. 7, the electric load controller 70 includes a communication unit 71 for receiving electric loads control signal, a power unit 73 that receives power from the power grid and detects a voltage, and an electrical load control unit 75 that controls the outputs of the electrical loads 72, 74, and 76. The electrical load control unit 75 may exist as multiple.

The external infrastructure information transmitting device 45 shown in FIG. 2 is a device configured for transmitting road traffic information to a vehicle. The technical contents follow the general specifications of V2X and refer to related data collecting and processing and transmitting terminals.

A gateway 80 is a communication gateway of a vehicle that converts data of heterogeneous communication networks or heterogeneous protocols such as LIN, CAN, and Ethernet to enable controllers to exchange communication data. A vehicle without the gateway 80 is also configured for direct communication between the controllers.

The engine controller 60 receives the operation signal of the ISG function through communication with the ISG controller 50 to determine whether the engine 65 is driven or not, includes an external communication unit 62, a power unit 64 and an engine controller 66, and is configured to drive the engine 65.

The navigation 90 is collectively referred to as a controller including map information, and the implementation may be various. The navigation 90 includes a communication unit 92, a GPS 94, and map information 96. The navigation 90 includes a GPS module and can provide location information to the vehicle.

Figure 9:
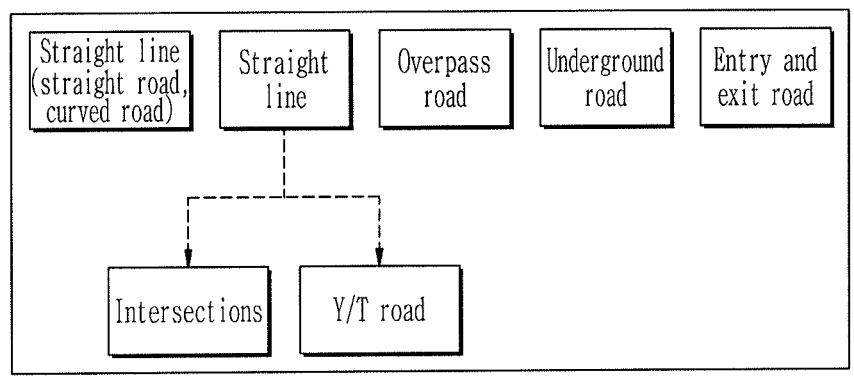
FIG. 9 is a table illustrating road type and number of data management items according to an exemplary embodiment of the present invention.

FIG. 8 is a table illustrating data management items necessary to determine ISG operation of an ISG controller according to an exemplary embodiment of the present invention, and FIG. 9 is a table illustrating road type and number of data management items according to an exemplary embodiment of the present invention.

Referring to FIG. 8, the data management items required for the ISG drive determination of the ISG controller 50 may be road and location information, road signal information, battery 20 information, and vehicle information. The external infrastructure information obtained by the ISG controller 50 through the communication unit 52 may be road and location information and road signal information. The road and location information and the road signal information are used to determine the characteristics of the current road and the location on the current route of the present vehicle according to the classification table of FIG. 9. ⓐ The road type and ⓑ the number of the branch roads in FIG. 9 may be managed by straight lines, intersections, overpasses, underground roads, entry and exit roads of FIG. 10, and in a case of ICs of straight roads, intersections, the number of the branch roads is updated.

In the road and location information related to FIG. 8, ⓒ the current vehicle location information is needed to determine the signal information to be currently referred to, and it is possible to use the data transmitted from the GPS and the corrected location through GPS, V2X, a map. ⓓ The current road lane number is needed to utilize the signal information to be referenced on the branch road, and may be determined by combining with GPS and data obtained from the map or V2X infrastructure.

Figure 10:
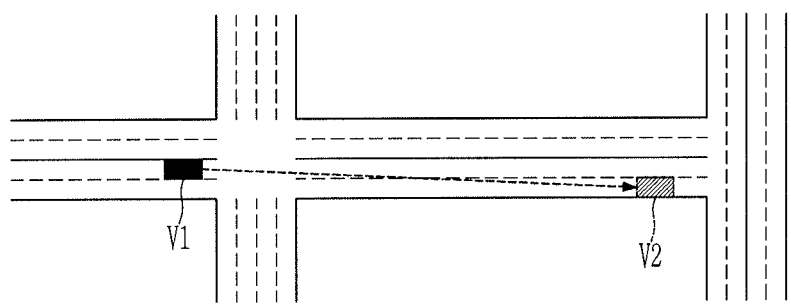
FIG. 10 is a drawing illustrating vehicle location for explaining signal type of diverging road of data management items according to an exemplary embodiment of the present invention.

The road signal information in FIG. 8 indicates a signal type that the vehicle may refer to on the road. FIG. 10 is a drawing illustrating vehicle location for explaining signal type of diverging road of data management items according to an exemplary embodiment of the present invention, and shows roads when T-shaped roads continue through four streets of four roads.

The vehicle V1 in the leftmost lane in FIG. 10 travels in the left turn/caution/stop signal and the vehicle V2 in the right lane travels in the stop/caution/driving signal, and when the vehicles V1 and V2 enter the T-shaped road, a table is constructed as shown in FIG. 11 and FIG. 12, respectively. Even if the vehicle exists on the right side, the vehicle can make a left turn and therefore manages all information which may be traveled.

FIG. 13 is a table illustrating signal change time matrix of signal type of diverging road at a crossroad of left side portion of FIG. 10. Based on the information transmitted from the road information through the V2X controller 40, forms and manages ⓔ a signal change time matrix for each signal type. The signal information to be changed in the future based on the time axis is listed and configured. The minimum device may be generated in seconds and a matrix may be generated based on the point at which the signal changes.

The battery charge information, ⓖ the battery charge amount, ⓗ the overage degree, the ⓘ battery consumption amount, and ⓙ the error information corresponding to the battery 20 information in FIG. 8 are periodically updated. Monitoring is possible in 100 ms increments, and it may be changed according to system characteristics. If the communication of the battery sensor 30 fails, the ISG operation time prediction is impossible. In the case of the communication error of the battery sensor 30 and the correction error of the battery sensor 30, an error item is set to stop the functional operation.

ⓚ The current ISG status, ⓛ the ISG operable time, ⓜ the current time, ⓝ the vehicle speed, and ⓞ the fuel injection amount information corresponding to the vehicle information related to FIG. 8 are acquired by the engine controller 60 in addition to the ISG controller 50 requesting the ISG drive it is an item that grasps whether the start is turned off during the actual stop.

Figure 14:
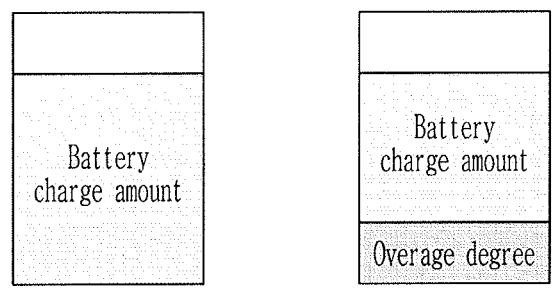
FIG. 14 is a drawing illustrating battery charge amount of initial battery and overage status battery according to an exemplary embodiment of the present invention.
Figure 15:
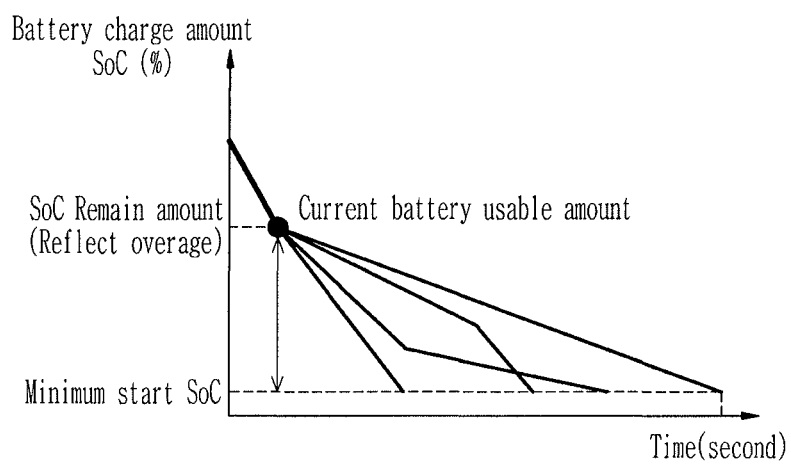
FIG. 15 is a graph for expecting ISG operable time according to battery charge amount according to an exemplary embodiment of the present invention.

As shown in FIG. 14, ⓛ the ISG operation time is determined based on the status information related to the battery 20 received from the battery sensor 30 after subtracting ⓗ the overage degree from ⓖ the initial charge amount of the battery 20, as shown in the graph of FIG. 5A, the slope of the current consumption is determined to the minimum chargeable amount at which starting is possible. As the battery 20 becomes overage, the ISG operation time is reduced due to the reduction in the amount of charge. That is, the ISG operation time is determined based on the status information related to the battery 20, a value obtained by subtracting the battery 20 overage degree from the initial charge amount of the battery 20, a current time and a value of the charge amount of the battery 20, after determining the consumption slope, it may be predicted as the time at the minimum charge amount at which the vehicle may be started.

(m) The current time may be obtained based on the time information transmitted from the V2X controller 40 and the GPS 94. Absolute value is determined using GPS time information, and when the V2X controller 40 transmits information, the V2X controller 40 compares two values. When an error of more than a predetermined value occurs, the V2X controller 40 stops the function or outputs the time information to be transmitted from the V2X controller 40 to operate.

(n) The vehicle speed is updated from the engine controller 60 to the real time information, and (o) the fuel injection amount value is determined by accumulating the average value of the fuel injection amount values required for starting at the start of the ISG.

Figure 16:
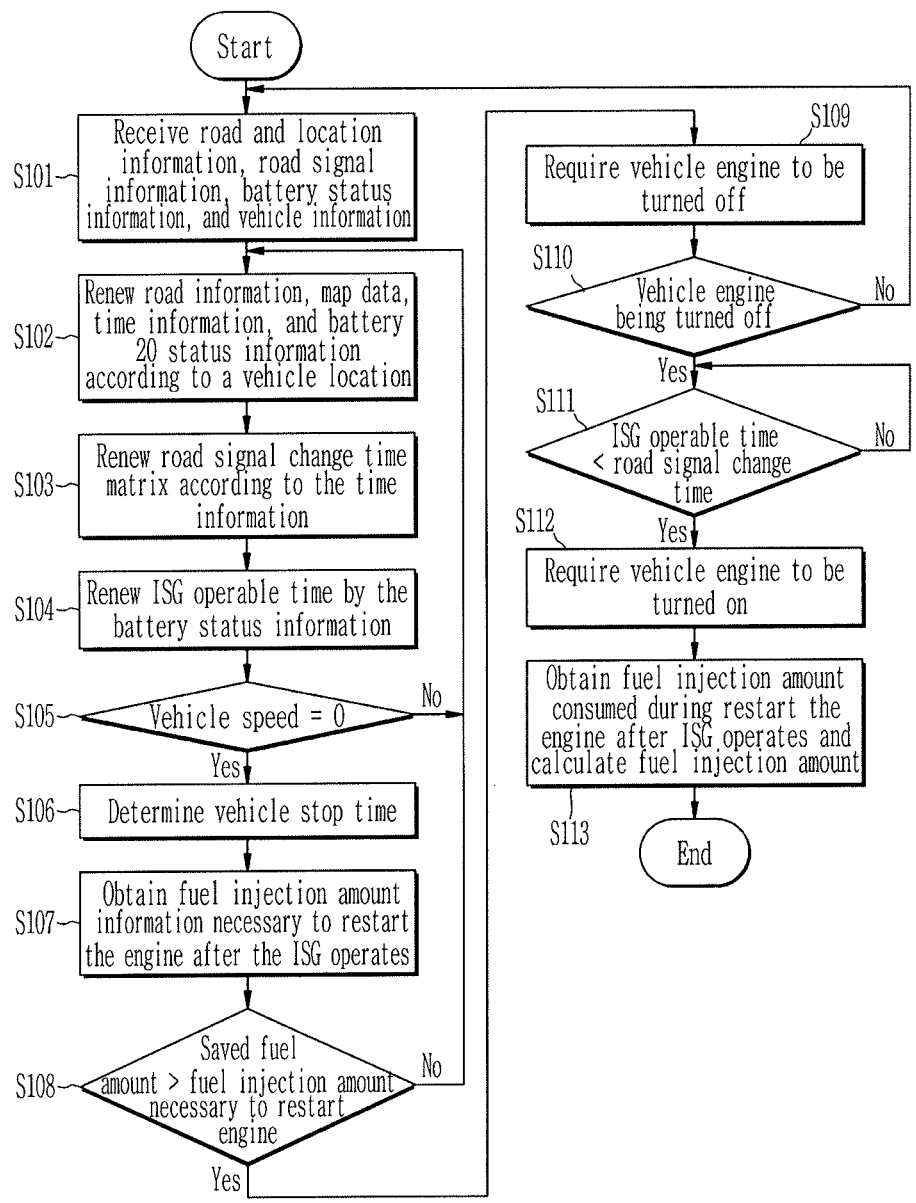
FIG. 16 is a flowchart illustrating a method for controlling ISG according to an exemplary embodiment of the present invention.

FIG. 16 is a flowchart illustrating a method for controlling ISG according to an exemplary embodiment of the present invention.

Referring to FIG. 16, in a method for controlling ISG according to an exemplary embodiment of the present invention, firstly, road and location information, road signal information, battery 20 status information, and vehicle information are received by an ISG controller 50 S101. The road and location information and road signal information may be collected from the external infrastructure information transmitting device 45 and transmitted to the ISG controller 50 through the V2X controller 40.

As such, road information, map data, time information, and battery 20 status information are renewed by the ISG controller according to a vehicle location S102. The battery 20 status information may be collected by the battery sensor 30 in the information on the charged amount of the battery 20. Vehicle location, and map data information may be collected by the navigation 90 device.

As such, road signal change time matrix is renewed according to the time information S103, and ISG operable time is renewed by the battery 20 status information S104. The ISG operation time is a value obtained by subtracting the overage degree of the battery 20 from the initial battery 20 charge amount and the current time and the value of the charge amount of the battery 20 based on the state information related to the battery 20, after obtaining the consumption slope, it may be predicted as the time at the minimum charge amount at which the vehicle may be started. Furthermore, the current time may be obtained based on the time information transmitted from the V2X controller 40 and the GPS 94.

As such, whether a vehicle speed is 0 is determined S105, and a vehicle stop time is determined by the road signal change time matrix if the vehicle speed is 0 S106. As such, fuel injection amount information necessary to restart the engine after the ISG operates is obtained S107.

As such, whether fuel amount being saved by the ISG operation is more than fuel injection amount necessary to restart the engine is determined S108, and a signal is transmitted to an engine controller 60 to turn off the engine 65 if the fuel amount being saved by the ISG operation is more than the fuel injection amount necessary to restart the engine S109.

As such, whether the engine 65 is turned off is determined S110, whether the ISG operable time is less than the road signal change time is determined if the engine 65 is turned off S111, and a signal is transmitted to the engine controller 60 to turn on the engine 65 if the ISG operable time is less than the road signal change time S112.

As such, a fuel injection amount consumed during restarting the engine after the ISG operates is obtained and a mean value of the fuel injection amount is determined S113. The total fuel injection amount may be determined by accumulating the average value of the fuel injection amount required for starting in the ISG operation.

Like this, according to an exemplary embodiment of the present invention, optimized control before the engine is turned off and after the engine is turned off and growth of ISG operable time may improve fuel efficiency effect by providing an ISG vehicle system which expects the ISG operable time using battery charge amount while driving and electric loads consumption amount and starts and ends the ISG operation by being connected to an external infrastructure information.

Furthermore, starter motor durability for ISG may be enhanced by optimizing starting ON/OFF.

Furthermore, usability may be improved by determining ISG operable time because the ISG operable time may be displayed.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An idle stop & go (ISG) vehicle system, comprising:
   an alternator supplying electric power of a vehicle and alternating engine power to electrical energy;
   a battery storing the electric power of the vehicle;
   a sensing and communicating unit device configured for monitoring a status of the battery, communicating with the outside of the sensing and communicating unit device, and determining a charge amount of the battery according to the status of the battery;
   a vehicle navigation unit transmitting global positioning system (GPS) information and an external infrastructure information transmitting device transmitting an external infrastructure information;
   a V2X controller device configured for receiving external infrastructure information and determining vehicle location, wherein the V2X controller device transmits information received from outside of the vehicle through wireless network from the external infrastructure information transmitting device to inside the vehicle;

an ISG controller device connected to the V2X controller device, wherein the ISG controller device is configured for obtaining the external infrastructure information and the vehicle location through communication with the V2X controller device and obtaining the status of the battery and charge amount information through communication with the sensing and communicating unit device to determine operable time of ISG function of the vehicle and whether the ISG function operates; and an engine controller configured for receiving an operation signal of the ISG function through communication with the ISG controller device to determine when the engine operates, wherein the V2X controller device combines the global positioning system (GPS) information received from the vehicle navigation unit and the external infrastructure information received from the external infrastructure information transmitting device to determine the vehicle location, and transmits the external infrastructure information and the vehicle location to the ISG controller device, and wherein the ISG controller device includes:
- a communication unit communicates with the sensing and communicating unit device and the V2X controller device; and
- an ISG driving determination unit realizing when the ISG function of the vehicle operates using information related to the status of the battery, the external infrastructure information and vehicle information obtained through the communication unit.

2. The ISG vehicle system of claim 1, further including:
electric loads consuming electricity and including an air conditioning blower, a chassis, an engine injector, a seat heating wire, and a ventilation motor.

3. The ISG vehicle system of claim 2, further including:
an electric load controller configured for receiving signal of the electric loads and for controlling an output of the electric loads to realize controlling function according to a predetermined function of an air conditioning system of the vehicle, a seat system, the engine and a transmission.

4. The ISG vehicle system of claim 1, wherein the sensing and communicating unit device includes:
- a communication unit transmitting and receiving information with outside thereof;
- a voltage sensing unit monitoring voltage status of the battery;
- a current sensing unit monitoring current coming and going to the battery;
- a temperature sensing unit monitoring liquid temperature of the battery; and
- a state of charge (SOC) determining unit determining status of charge of the battery using the voltage, the current, and the liquid temperature of the battery.

5. The ISG vehicle system of claim 1, wherein the external infrastructure information includes road and location information and road signal information.

6. The ISG vehicle system of claim 5, wherein the road and location information includes road type, diverging road number, current vehicle location, and current driving road lane number.

7. The ISG vehicle system of claim 5, wherein the road signal information includes signal type of diverging road, and signal change time matrix of the signal type of diverging road.

8. The ISG vehicle system of claim 1, wherein the information related to the status of the battery includes battery charge amount, battery overage degree, battery consumption amount, and battery error information.

9. The ISG vehicle system of claim 1, wherein the vehicle information includes current ISG status, ISG operable time, current time, vehicle speed, and fuel injection amount.

10. A method for controlling idle stop & go (ISG) operation of a vehicle, the method including:
- receiving road and location information, road signal information, information related to a status of a battery, and vehicle information by an ISG controller device, wherein the road and location information and the road signal information are collected from an external infrastructure information transmitting device and transmitted to the ISG controller device by a V2X controller device connected to the ISG controller device;
- renewing the road information, map data, time information, and the information related to the status of the battery according to a vehicle location by the ISG controller device;
- renewing road signal change time matrix according to the time information;
- renewing ISG operable time by the information related to the status of the battery;
- determining when a vehicle speed is 0;
- determining a vehicle stop time by the road signal change time matrix when the vehicle speed is 0;
- obtaining fuel injection amount information necessary to restart the engine after the ISG operates;
- determining when fuel amount being saved by the ISG operation is more than fuel injection amount required to restart the engine;
- transmitting a signal to an engine controller to turn off the engine when the fuel amount being saved by the ISG operation is more than the fuel injection amount required to restart the engine, wherein the engine controller is configured to control configured for the engine of the vehicle;
- determining when the engine is turned off;
- determining when the ISG operable time is less than road signal change time when the engine is turned off;
- transmitting a signal to the engine controller to operate the engine when the ISG operable time is less than the road signal change time; and
- obtaining a fuel injection amount consumed during restarting the engine after the ISG operation is performed and determining a mean value of the fuel injection amount, wherein the ISG controller device includes:
- a communication unit communicates with a sensing and communicating unit device and the V2X controller device; and
- an ISG driving determination unit realizing when an ISG function of the vehicle operates using information related to the status of the battery, external infrastructure information and vehicle information obtained through the communication unit.

11. The method for controlling the ISG of claim 10, wherein the information related to the status of the battery is collected as battery charge amount information by the sensing and communicating unit device.

12. The method for controlling the ISG of claim 10, wherein the vehicle location and the map data are collected by a navigation unit.

13. The method for controlling the ISG of claim 10, wherein the ISG operable time is determined as a time at a minimum charge amount in which vehicle start is possible after obtaining inclination of battery consumption amount by obtaining a difference value between initial battery charge amount and battery overage degree, current time, and battery charge amount value on a basis of the information related to the status of the battery.

14. The method for controlling the ISG of claim 13, wherein the current time is obtained on a basis of time information transmitted from the V2X controller device and a global poisoning positioning system (GPS).

15. The method for controlling the ISG of claim 14, wherein total fuel injection amount is determined by accumulating mean values of fuel injection amount required to start the engine when the ISG operation is performed.

* * * * *